United States Patent [19]

Anderson, Jr. et al.

[11] 3,933,548
[45] Jan. 20, 1976

[54] PRODUCTION OF URETHANE FOAMS AND LAMINATES THEREOF

[75] Inventors: Harry M. Anderson, Jr., Marblehead; Charles K. Knisely, Boxford, both of Mass.

[73] Assignee: Beatrice Foods Co., Peabody, Mass.

[22] Filed: Aug. 19, 1974

[21] Appl. No.: 498,584

[52] U.S. Cl. ............ 156/78; 156/246; 260/2.5 AE; 260/2.5 AY; 264/DIG. 5; 428/320; 428/423
[51] Int. Cl.² ..................... B32B 5/20; B32B 5/18
[58] Field of Search ............... 117/161 KP, DIG. 3; 264/DIG. 5; 260/2.5 AE, 2.5 AY; 156/79, 78, 246; 428/320, 322, 423

[56] References Cited
UNITED STATES PATENTS

| | | | |
|---|---|---|---|
| 3,256,131 | 6/1966 | Koch et al. | 156/79 |
| 3,262,827 | 7/1966 | Kallander et al. | 156/230 |
| 3,692,708 | 9/1972 | Meisert et al. | 264/DIG. 5 |
| 3,826,764 | 7/1974 | Weber | 260/2.5 AE |

OTHER PUBLICATIONS

"Blowing Agents," by Henry R. Lasman, National Pairchemicals, Inc., Wilmington, Mass., Vol. 2, pp. 539–540 relied upon.

*Primary Examiner*—Edward G. Whitby
*Attorney, Agent, or Firm*—Wolf, Greenfield & Sacks

[57] ABSTRACT

Thin flexible urethane foam film layers are produced by spreading a layer of polyurethane reactants over a carrier sheet at a uniform layer thickness. The polyurethane reactants consist essentially of an isocyanate and a hydroxyl terminated polyol having an inorganic carbon dioxide producing blowing agent incorporated therein and being free of water. The unconfined film layer is then heated to a temperature in the range of from 260°F to 390°F to cause gellation and release of the carbon dioxide in the mixture with final formation of a uniform thickness flexible polyurethane foam product.

11 Claims, 2 Drawing Figures

PRODUCTION OF URETHANE FOAMS AND LAMINATES THEREOF

BACKGROUND OF THE INVENTION

Thin, flexible polyurethane foam film layers have long been known in the art for use in laminates comprising the foam films and surfacing sheets or films of synthetic resins such as vinyls, urethanes, polyesters and the like. Often, the foam film is backed with a textile or fabric layer which adds strength to the laminate and the surfacing film is formed of a solid synthetic resin of extremely thin film thickness which merely gives ornamentation and esthetically pleasing surfacing to the laminate. Such combined materials are often used as clothing fabrics, leather substitutes and in other applications where leather and textile piece goods had previously been used.

The function of the urethane foam film in such laminates is to provide bulk, improve the hand of the material and stop the weave in underlying textile fabrics from showing through upon application of pressure to the skin layer as might be caused by bendng of the laminate.

There have been certain difficulties in obtaining thin flexible polyurethane foam films of uniform thickness for use in such fabric laminates. Ordinarily, the foam films are formed by conventional urethane foaming techniques which include the use of a water catalyst to generate carbon dioxide thus forming the foam. This often results in nonuniform density and film layer thickness in the final film and/or the need for mechanically confining the film during foam formation. Freon has been used to form foams in the past. However, blowing with Freon is hard to control, often requires confined molding and is not suitable for efficient production of thin urethane foam films. Continuous production methods for forming such thin polyurethane flexible foam films and producing laminates thereof with skin and textile layers often create difficulties using conventional techniques.

SUMMARY OF THE INVENTION

It is an important object of this invention to provide a highly efficient method for forming uniform density, uniform thickness thin film polyurethane foams.

Another object of this invention is to provide a method in accordance with the preceding object which can be carried out with the use of an independent chemical blowing system.

Still another object of this invention is to provide a method in accordance with the preceding objects which is carried out without the need for confining the foam during its formation.

Still another object of this invention is to provide a method in accordance with the preceding objects and which permits continuous production of polyurethane foam films in laminated or homogeneous forms.

According to the invention, a flexible polyurethane foam film having uniform controlled film thickness and density is formed by spreading a layer of polyurethane reactants in a mixture over a carrier sheet at a uniform layer thickness. The polyurethane reactants consist essentially of an isocyanate and a hydroxyl terminated polyol preferably having from 1 to 10% by weight thereof of an inorganic carbon dioxide generating blowing agent incorporated therein. The film layer is then heated to a temperature preferably in the range of from 260°F to 390°F to cause release of the carbon dioxide in the mixture and formation of polyurethane foam in a uniform thickness final cured product.

Preferably, the carbon dioxide generating blowing agent is sodium bicarbonate and the final film thickness is in the range of from 0.006 to 0.140 inch with a thickness of from 0.010 to 0.025 inch being preferred. Most preferably the blowing agent is used in amounts of from 1 to 5% by weight of the polyurethane reaction mixture. When higher amounts are used hydrolytic stability can be adversely affected and with amounts over 10% there is a tendency to produce nonuniform thickness foam. The foam density is preferably in the range of from 25 to 50 lbs/cu. ft. In the preferred embodiment, the film is formed in a continuous process for producing a laminate having a textile backing. Thus, the mixture is spread at a uniform thickness over a carrier sheet. The carrier sheet is passed to a heating zone where the bicarbonate blowing agent decomposes to foam the mixture, and the mixture is partially cured. At this point, a sheet of backing and supporting material such as a textile layer can be continuously passed onto the foam formed without the use of a supplementary adhesive, whereupon the composite is passed to a second heating area to fully cure the foam. In an alternate embodiment, the foam is fully cured in the first heating area and the textile supporting layer can be continuously passed onto the moving laminate with the use of supplementary adhesive to form a final laminate. In some cases, the carrier sheet can be a release surface such as a Teflon belt or release paper if it is desired to otain the foam without a skin surface as will be described.

Preferably the urethane reactant mixture used has a long pot life and in all cases, no water is introduced into the mixture since water could cause unwanted, uncontrolled foaming. Preferably the mixture used is a two-part mixture having a pot life of at least 3 hours at 72°F. In the preferred embodiment, the mixture comprises a first component formed of a polyol, a foam cell stabilizer, a bicarbonate blowing agent, filler and a chain extender. The second component is preferably an isocyanate carrying a small amount of benzoyl chloride which inhibits urethane reaction during pot life when the two parts are mixed together. The mixture preferably has a workable viscosity in the range of from 10,000 to 20,000 centipoise and most preferably 16,000 centipoise as measured on a Brookfield RVT Viscometer Spindle No. 4 at 20 rpm and at a temperature of 23°C. This viscosity range is preferred when using a knife coater to deposit the mixture although other viscosities can be used with other conventional coating techniques. The reactant mixture is preferably coated on a release surface or surfacing layer at a thickness approximately one-half that desired in the final formed foam layer.

It is a feature of this invention that continuous production of thin film layers of uniform density, uniform thickness polyurethane foam can be formed in a continuous process and continuously laminated to a textile backing in the process rapidly and efficiently. Similarly, a surfacing skin for the foam can be continuously formed in the same procedure. The resultant laminates have uniform density and thickness, desirable bulk, good hand and good resistance to deterioration of the surface as by bending and wrinkling when used for artificial garment material and artificial leathers.

BRIEF DESCRIPTION OF THE DRAWINGS

The above and other features, objects and advantages of the present invention will be better understood from a reading of the following specification in conjunction with the accompanying drawings in which.

DESCRIPTION OF PREFERRED EMBODIMENTS

Figure 2:
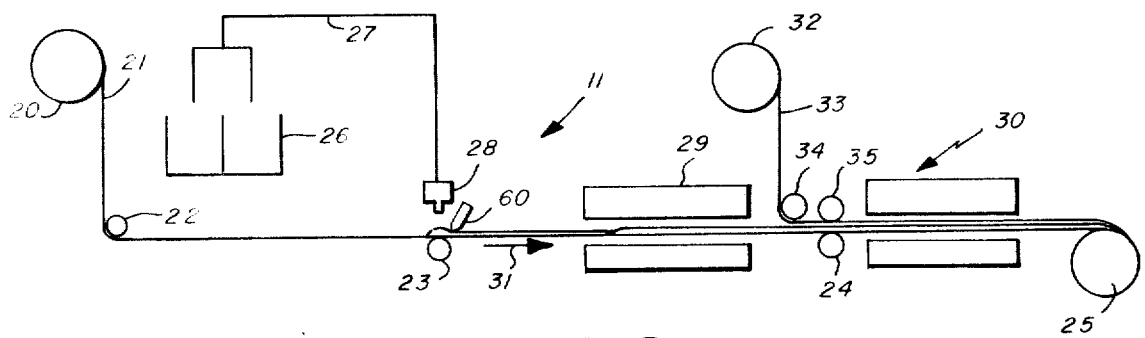
FIG. 2 is a semidiagrammatic showing of a preferred embodiment of the method of this invention.

With reference now to the drawings a preferred embodiment of a laminate containing a thin flexible polyurethane foam film in accordance with this invention is illustrated generally at 10 with a diagrammatic representation of the steps in the method of forming the laminate 10 being shown generally at 11 in FIG. 2. The laminate 10 of the preferred embodiment is in the form of the sheet to be used as an artificial leather in a garment such as an artificial leather coat. The laminate 10 comprises a first skin layer 12 of solid polyurethane skin coating material having a thickness of 0.0009 to 0.003 inch. The foam film layer 13 is bonded to layer 12 and preferably has a uniform thickness of 0.010 – 0.025 with a cotton cloth backing acting as a support layer 14 adhered to the foam layer 13. Laminates can be formed in accordance with the method of this invention with various layers as described and in some cases, a thin film foam itself can be formed and later laminated to other materials in separate procedures. The surfacing layer 12 can be formed of conventional surfacing materials such as vinyl films, polytetrafluoroethylene, polyethylene, gelled plastisols and the like. In some cases, the surfacing layer can be applied or formed after formation and bonding of the foam to a supporting layer 14, as known in the art. Alternatively, in some cases, the foam can be deposited directly on a preformed surfacing sheet 12 and bonded directly thereto in the method of this invention illustrated in FIG. 2.

The support layer 14 can also be of a variety of different materials including fibrous woven and unwoven textile materials, polytetrafluoroethylene, polyethylene and the like as desired.

Laminates of the type described above are preferably formed in a process as illustrated in FIG. 2. The process is carried out in an apparatus which consists of a supply roll 20 of carrier web sheet material 21 which has a release surface, fed through a series of rollers 22, 23, 24 and onto a takeup roll 25. A two-chamber holding tank 26 carries the polyurethane reactants which are metered and pumped through a conventional piping system 27 to a mixing head 28 which mixes the two components and deposits the polyurethane reactants containing mixture onto the underlying carrier web. When the two components are premixed in tank 26, the head 28 acts to merely meter and apply the mixture to the underlying web. Conventional heating ovens 29 and 30 surround spaced portions of the sheet material 21 during its travel along the path of arrow 31. A supply roll 32 mounts a support material 33 for passage through suitable guide roll 34 to a squeeze roll assembly formed by a conventional squeeze roll 35 acting in conjunction with roll 24.

In the process illustrated in FIG. 2, a carrier web 21 is fed along the path 31. The carrier web can be a release paper where a foam surface is desired for later treatment or can be a release paper carrying a thin film of a surfacing layer such as a vinyl layer 0.0005 inch thick to which the foam is to be adhered during the process and which remains as the surfacing layer in the final product. Alternately, the carrier web itself can be the surfacing web as for example when a 0.002 inch thick surfacing layer of vinyl plastic is used. The web 21 passes under the foam applying head 28 preferably at a speed of from 8 to 20 feet per minute with the mixture of polyurethane reactants from the tank 26 being applied to the surface of the sheet and spread uniformly therealong by a knife coater 60. The urethane reactants film preferably has a uniform thickness of from 0.003 to 0.07 inch. The so treated web is then passed through the first baking oven 29 where is is exposed to a temperature of from preferably 260°F to 390°F for about one-half minute or a time sufficient to cause gellation and foaming due to release of the blowing agent after curing of the polyurethane to the gel state. As known in the art, the terms "gellation" or "the gel state" refer to a degree of cure where the mixture is no longer flowable yet still tacky and not fully cured. The foam is then passed to the rollers 34, 35, 24 where the web 33, which may be a textile or other support web, is laid onto the surface while the foam is still in a tacky state thus avoiding the need for an adhesive. The composite laminate then passes to the oven 30 where it is heated to a temperature preferably in the range of from 260°F to 390°F for ½ to 3 minutes causing formation of cured polyurethane in a final product which is wound on a takeup reel 25. In some cases, where desirable, a single elongated heating oven 29 can be used and the support fabric 33 is later applied with the use of an adhesive to form the final product. In such cases, foaming occurs first in the first portion of the oven 29 with final curing occurring further along in the oven to form the final product. Where the carrier web is a release paper it can be removed after winding on takeup reel 25 or a second takeup reel can be used prior to reel 25 to wind the release paper with the final product wound on reel 25.

A key feature of this invention is the use of a urethane reactant mixture which contains an inorganic salt which is substantially nonreactive with isocyanate, yet releases carbon dioxide in an amount sufficient to foam the reactants. The mixture is preferably a two-part mixture having a long pot life of at least 3 hours although in some forms of the invention, the pot life can be shorter. The first component preferably comprises a polyol mixed with a cell stabilizer, a blowing agent, a filler, and a chain extender. The polyol used can be any hydroxyl polyol such as a polyester or polyether resin having a hydroxyl range of from 25 to 200. Suitable polyols include but are not limited to, for example, the reaction product of a polycarboxylic acid and a polyhydric alcohol. Any suitable polycarboxylic acid may be used in the preparation of the polyesters, such as, for example, adipic acid, succinic acid, suberic acid, sebacic acid, oxalic acid, methyl adipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid, benzene tricarboxylic acid and the like. Of course, the corresponding acid anhydrides may also be used. Any suitable polyhydric alcohol may be used in the preparation of the polyesters, such as, for example, ethylene glycol, propylene glycol, butylene glycol, hexanediol, bis-(hydroxy-methyl cyclohexane), 1,4-butanediol, diethylene glycol, neopentyl glycol, polyethylene glycol, 2,2-dimethyl propylene glycol, xylylene glycol, trimethylol ethane, trimethylol propane, glycerine, pentaerythritol, sorbitol, and the like. Also included in the definition of hydroxyl polyesters are lactone polyesters such as a caprolactone polyesters and also polycarbonates such as 1,6-hexane diol polycarbonates and the like. It is generally preferred that the polyurethane elastomeric plastics have a substantially linear configuration and, therefore, the difunctional acids and alcohols are preferred.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, condensates of ethylene oxide, propylene oxide, butylene oxide, amylene oxide, styrene oxide, and mixtures thereof. The polyalkylene ethers prepared from tetrahydrofuran may also be used. The polyhydric polyalkylene ethers may be prepared by any known process such as, for example, the process described in the "Encyclopedia of Chemical Technology;" Volume 7, pages 257 to 262, published by Interscience Publishers in 1951.

Additives such as dispersing agents, cell stabilizers and surfactants may be employed in preparing the polyurethane cellular materials of this invention. Thus a finer cell structure may be obtained if water-soluble organo silicone polymers are used as surfactants or cell stabilizers. These organo silicone polymers should have a molecular weight of about 2,500 to 6,000 and may be obtained by condensing a polyalkoxyl polysilane with the monoether of a polyalkylene ether glycol in the presence of an acid catalyst. Other surfactants such as ethylene oxide modified sorbitan monopalmitate or ethylene oxide modified polypropylene ether glycol may be used, if desired, to obtain better dispersion of the components. Representative surfactants which are water-soluble organo silicone polymers are available commercially as X-520, X-521 and L5303 from Union Carbide Corporation. Such stabilizers and surfactants can be used in conventional amounts of from 0.05 to 0.5% by weight of the polyol.

The blowing agent which is nonreactive with the other components of the mixture, is an inorganic carbon dioxide releasing salt. Sodium bicarbonate has been found to be particularly suitable for use as a blowing agent in forming thin foam films of uniform thickness without the need for confining the layer as the foam forms. Preferably the sodium bicarbonate is in finely divided powder form and uniformly dispersed in the reactants mixture.

The chain extender can be any conventional chain extender known for use with the particular resin system used. The difunctional chain extenders may be of th aliphatic, cycloaliphatic or aromatic type and they are best illustrated by diols, diamines, or aminoalcohols. Illustrative difunctional chain extenders include ethylene glycol, propylene glycol, 1,4-butane-diol, 1,3-butanediol, 1,5-pentanediol, 2,2-dimethyl-1,3-propanediol, 1,7-heptanediol, 1,6-hexanediol, 1,10-decanediol, 1,12-dodecanediol, diethylene glycol, triethylene glycol, dibutylene giycol, 1,4-cyclohexanediol, 1,4-bis(2-hydroxyethoxy) cyclohexane, 1,4-bis(2-hydroxyethoxy)benzene, 2-mercaptoethanol. Low molecular weight polyols are preferred and are preferably used in amounts of from 0 to 10% by weight of the entire formula.

Conventional pigments and fillers are used to give bulk to the partially or uncured film during foaming so as to confine the gas in the film. Conventional fillers such as ASP 100 clay (aluminum silicate) in particle form of 0.5 micron particles, diatomaceous earth, asbestos fibers, silica, calcium carbonate, titanium dioxide, barytes, carbon black and the like are useful. These are preferably used in amounts of from 5 to 25% by weight of the polyol composite.

The second component of the system preferably comprises an isocyanate and a reaction stabilizer and is preferably mixed in stoichiometric amounts with the polyol component.

As polyisocyanates in this invention there are employed such aromatic polyisocyanates as tolylene diisocyanate (TDI), diphenylmethane diisoycanate (MDI), dianisidine diisocyanate, biphenylene diisocyanate, naphthylene diisocyanate, phenylene diisocyanate, triphenylmethane triisocyanate, or diphenylether triisocyanate, etc., such aliphatic polyisocyanates as tetramethylene diisocyanate, hexamethylene diisocyanate, etc., and such addition products as those having two or more terminal —NCO groups, which are obtained by the reaction of above mentioned polyisocyanates in excess with lower molecular polyols such as ethylene glycol, propylene glycol, glycerol, hexane triol or trimethylol propane, or with polyester polyol or polyester polyol described above.

Among these polyisocyanates, there are preferably employed such compounds as aromatic polyisocyanates or addition products having two or more —NCO groups which are obtained by the reaction of aromatic polyisocyanates in excess with lower molecular polyols, or with the polyether polyols or the polyester polyols, especially tolylene diisocyanate (TDI), diphenylmethane diisocyanate (MDI) or addition product of the lower molecular polyols or the polyether polyols with excess TDI or MDI.

The second component preferably comprises in addition, 0 to 2% by weight of the entire mixture of benzoyl chloride which acts as a reaction stabilizer and inhibits the urethane reaction during pot life, acting to give the desired pot life of up to 3 hours and perhaps more.

Methylene chloride is preferably used as a carrier for the benzoyl chloride although other carriers such as ketones or acetate solvents used in amounts of from 1 to 10% by weight of the isocyanate can be used.

In addition, the first or second part can contain known viscosity modifiers, pigments, colorants and the like as known in the art.

In all cases, it is preferred that the polyurethane reactants mixture be substantially free flowing when applied to the carrier web and have a viscosity of 10,000 to 20,000 centipoise yet result in a flexible urethane foam preferably having a density of from 25 to 50 lbs/cu/ft.

Preferably the polyurethane reactants mixture is designed so as to have it reach a gel state in the first oven 29 at the same time or slightly before the $CO_2$ is being evolved to form the foam. Thus, the viscosity is raised to a point where the carbon dioxide acts to foam the mixture and is not merely dissipated to the surrounding atmosphere.

Preferably, the two components of the polyurethane reactants mixture are carried in a vat and are passed directly to the web 21 in a continuous manner. The components can be separated into two different vats as in 26 with the isocyanate contaning portion and the polyol containing portion mixed in a mixing head such as a mixing head at 28 and then passed to the web 21. In this case, the pot life limitation is avoided permitting a wide range of polyurethane reactants mixtures to be employed in the process of this invention. The two components can be uniformly mixed in a single tank 26 and metered on to the carrier web 21 in a continuous manner. In this modification the long pot life assures continuous operation without premature curing or polymerization of the reactants.

It is important that no water be added to the mixture in order to avoid unwanted uncontrolled foaming of the reactants. Moreover, because the inorganic blowing agent is uniformly incorporated in the mixture and $CO_2$ substantially uniformly evolved, it is not necessary to confine the foam as it expands in order to obtain uniform thickness and uniform density. Water may be inherently present in some of the reactants as an impurity. In such cases it must be present in an amount insufficient to appreciably contribute to the foaming reaction. Preferably the water impurity should not be over 0.1% by weight of the reaction mixture.

The following, nonlimiting, examples are illustrative of the present invention:

EXAMPLE 1

In a preferred example, the apparatus of FIG. 2 is used to produce a foam laminate which is particularly suitable for use as an artificial leather in garment material. The reactant mixture is formed by uniformly mixing stoichiometric amounts of component A and component B and charging vat 26 with the components uniformly mixed together. The two components of the mixture are as follows:

| Component A | % by weight of total A |
| --- | --- |
| Butylene-ethylene adipate (hydroxyl number 55-58) | 56.36 |
| Diethylene adipate(hydroxyl number 53-57) | 20.00 |
| 1,4, butane diol | .78 |
| Castor oil (OH Number 164) | 4.68 |
| Silicone oil (L5303 copolymer of dimethysiloxane and polyalkylene oxide) | .23 |
| Sodium bicarbonate (finely divided powder rubber grade) | 4.67 |
| Filler - powdered silica | 13.28 |

| Component B | % by weight of Total B |
| --- | --- |
| Isocyanate adduct of 2 moles of trimethylol propane, 3 moles 1,3 butylene glycol and 11 moles toluene diisocyanate | 81.2 |
| Diethylene adipate | 9.7 |
| Cellosolve acetate | 9.1 |

The release paper is 40 inch wide TK matte paper coated with a dull finish silicone produced by S. D. Warren Co. of Eastwood, Maine. The textile backing layer 35 is a 40 inch wide, slightly napped, sateen number 510, low loft, cotton fabric produced by Deering-Milliken Company of Exeter, New Hampshire. Heating oven 29 is maintained at a temperature of 320°F with oven 30 mantained at a temperature of 340°F.

The release paper 21 having its release surface upward as shown in FIG. 2 is precoated with a cast 1 mil dry thickness polyester urethane skin on its release surface and is continuously moved along the path of arrow 31 at a speed of 8 feet per minute. Head 25 deposits the urethane reactant mixture on the skin layer and knife coater 60 uniformly coats the reactant mixture at a layer thickness of 0.012 inch. The coated carrier web 21 passes through oven 29 in one-half minute where gelling occurs followed by release of carbon dioxide from the bicarbonate to increase the reactant mixture to a uniform foam layer thickness of approximately 0.025 inch. The textile fabric 33 is nipped into the tacky gelled foam at rollers 34, 35 and 24 under a controlled pressure which does not collapse the foam but merely provides contact of the textile layer with the tacky foam. The so formed laminate is then passed through oven 30 for approximately 2 minutes whereupon it is wrapped around reel 25 in its completed form. The release paper can later be removed when the roll 25 is unwound or alternately, a second takeup roll can be used prior to roll 25 in order to wrap the release paper leaving the final foam laminate in a 40 inch roll wound on roller 25.

Figure 1:
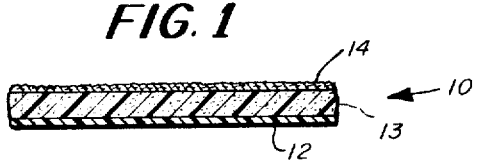
FIG. 1 is a cross sectional view through a laminated artificial leather material made in accordance with a preferred embodiment of this invention.

The laminate of FIG. 1 has good hand, uniform foam layer thickness, good lamination and is eminently suitable for use as an imitation leather in fabric material.

EXAMPLE 2

In a second embodiment of this invention, Example 1 is repeated except that in place of component B used in Example 1, the following formulation is used:

a modified 4-4' diphenylmethane diisocyanate (143 L produced by Upjohn Corporation of Kalamazoo, Michigan) — 94.12% by weight
methylene chloride 4.70% by weight
benzoyl chloride 1.18% by weight The resulting laminate again conforms to that illustrated in FIG. 1 and has the desired properties of this invention including uniform thickness, uniform density foam in the thin layer formed.

While specific examples of the present invention have been shown and described above, many variations are possible. For example, the use of the inorganic blowing agent which evolves carbon dioxide is a key feature and can be employed in a process to produce flexible polyurethane foam films alone without further laminating steps. While sodium bicarbonate in finely divided form gives outstanding results, other carbon dioxide producing salts can be used if they yield the desired properties in final foam films formed within the temperature ranges of this invention. The urethane foam produced has a flexibility due to its hardness value which is preferably in the durometer range of 50 Shore A to 80 Shore A, which characteristic lends good advantages to foam used for garment materials and the like.

While a continuous method of production is preferred because of its economic advantage in most situations, the process of this invention is also useful to form uniform thickness uniform density polyurethane foams in non-continuous operations. Thus, the polyurethane reactants mixture of this invention can be deposited directly on a release paper which is transferred to a curing oven, foamed and gelled and then used directly in batch operations.

What is claimed is:

1. A method of forming a flexible polyurethane foam layer having uniform controlled film layer thickness, said method comprising,
spreading a layer of a polyurethane reactants containing mixture over a carrier surface in a uniform layer thickness, said polyurethane reactants consisting essentially of an isocyanate and a hydroxyl terminated polyol having from 1 to 9% by weight thereof of an inorganic carbon dioxide producing blowing agent incorporated therein, and heating said layer to a temperature in the range of from 260°F to 390°F to cause release of carbon dioxide in said mixture and formation of polyurethane foam in a uniform thickness final product.

2. A method in accordance with the method of claim 1 wherein said inorganic blowing agent is sodium bicarbonate and said foam thickness is in the range of from 0.006 to 0.140 inch.

3. A method in accordance with claim 2 wherein said film of urethane reactants is continuously spread over a continuously moving carrier sheet and said heating is carried out in an oven through which said sheet passes.

4. A method in accordance with the method of claim 3 wherein said oven acts to bring said mixture to a gel state while causing evolution of carbon dioxide to foam said gel, and thereafter curing said foam at a uniform thickness.

5. A method in accordance with the method of claim 4 and further comprising continuously passing a supporting layer web into contact with a surface of said gelled layer while it is tacky to form a laminate therewith prior to final cure of said polyurethane foam.

6. A method in accordance with the method of claim 1 wherein said urethane reactants are spread over a surfacing web and adhered thereto.

7. A method in accordance with the method of claim 6 and further comprising heating said foam layer to a gelled state while causing evolution of carbon dioxide, passing a supporting layer web into contact with a surface of said gelled foam layer to form a laminate therewith, and heating to cure said polyurethane foam in a composite laminate.

8. A method in accordance with the method of claim 7 wherein said foam layer thickness is in the range of from 0.010 to 0.025 inch.

9. In a method of forming polyurethane foam layers having hardness values of 50 Shore A to 80 Shore A from polyurethane reactants containing mixtures comprising an isocyanate and a polyol, the improvement comprising, incorporating in the reactants from 1 to 9% by weight of powdered sodium bicarbonate nonreactive with the isocyanate and capable of releasing carbon dioxide at temperatures in the range of from 260°F to 390°F, positioning a film of from 0.003 inch to 0.07 inch of said mixture on a carrier layer in a uniform thickness, and heating said film to form a urethane foam having a uniform thickness of from 0.006 to 0.140 inch.

10. A method in accordance with the improvement of claim 9 wherein said polyurethane reactants comprise a first component containing an isocyanate and a second component containing a polyol and said sodium bicarbonate.

11. A method in accordance with the method of claim 10 and further comprising said isocyanate containing component further comprising benzoyl chloride in an amount to inhibit a polyurethane reaction and give a pot life of the two components when mixed of at least 3 hours at 72°F.

* * * * *